United States Patent
Matsumoto et al.

(10) Patent No.: US 7,488,442 B2
(45) Date of Patent: Feb. 10, 2009

(54) GLASS LAYERED CERAMIC PRODUCT

(75) Inventors: Arata Matsumoto, Tokoname-shi (JP);
Shinji Itou, Tokoname-shi (JP);
Takahiro Morita, Tokoname-shi (JP);
Yuuichirou Aihara, Tokoname-shi (JP);
Rui Yamashita, Tokoname-shi (JP);
Haruyuki Mizuno, Tokoname-shi (JP);
Shigeo Imai, Aichi (JP); Noriyuki Sugiyama, Aichi (JP); Shungo Tokushima, Aichi (JP); Shinichiro Ishida, Aichi (JP)

(73) Assignee: INAX Corporation, Tokoname-shi (JP)

( * ) Notice: Subject to any disclaimer, the term of this patent is extended or adjusted under 35 U.S.C. 154(b) by 664 days.

(21) Appl. No.: 10/399,397

(22) PCT Filed: Oct. 1, 2001

(86) PCT No.: PCT/JP01/08672

§ 371 (c)(1),
(2), (4) Date: Sep. 12, 2003

(87) PCT Pub. No.: WO02/32834

PCT Pub. Date: Apr. 25, 2002

(65) Prior Publication Data

US 2005/0035500 A1    Feb. 17, 2005

(30) Foreign Application Priority Data

Oct. 19, 2000  (JP) .................. 2000-318845
Oct. 19, 2000  (JP) .................. 2000-318846
Nov. 17, 2000  (JP) .................. 2000-351687

(51) Int. Cl.
*C04B 33/34* (2006.01)

(52) U.S. Cl. ...................... 264/602; 428/432
(58) Field of Classification Search ................. 264/602;
428/428, 432, 323, 699, 325, 332, 426, 702,
428/704, 697
See application file for complete search history.

(56) References Cited

U.S. PATENT DOCUMENTS 5,379,017 A    1/1995  Katsuno
5,807,641 A *  9/1998  Oku et al. .................. 428/701

(Continued)

FOREIGN PATENT DOCUMENTS

EP           484746         5/1992

(Continued)

*Primary Examiner*—Carlos Lopez
(74) *Attorney, Agent, or Firm*—Oblon, Spivak, McClelland, Maier & Neustadt, P.C.

(57) ABSTRACT

A product having a glass layer is produced that can be produced at low cost and can exhibit excellent antibacterial function. A base body, a first glazing material capable of forming a first glass layer on a surface of the base body, and a second glazing material capable of forming a second glass layer containing a silver compound on the surface of the base body. A first glazing material layer comprising the first glazing material and, on the surface side, a second glazing material layer comprising the second glazing material are formed on the surface of the base body. The first glazing material layer and the second glazing material layer are melted to form a first glass layer and a second glass layer. The second glazing material layer has a higher viscosity upon melting than the first glazing material layer.

3 Claims, 8 Drawing Sheets

U.S. PATENT DOCUMENTS 6,548,162 B1 * 4/2003 Machida et al. ............. 428/336
6,673,433 B1 * 1/2004 Saeki et al. ................. 428/323

FOREIGN PATENT DOCUMENTS

| | | |
|---|---|---|
| EP | 555849 | 8/1993 |
| EP | 0 615 964 | 9/1994 |
| EP | 653 161 | 5/1995 |
| EP | 696627 | 2/1996 |
| EP | 0 808 570 A1 | 11/1997 |
| FR | 2 763 933 | 12/1998 |
| JP | 2-164765 | 6/1990 |
| JP | 07-196385 | 8/1995 |
| JP | 9-20578 | 1/1997 |
| JP | 10-236846 | 9/1998 |
| JP | 11-278969 | 10/1999 |
| JP | 2000-178088 | 6/2000 |
| JP | 2000-232948 | 8/2000 |
| JP | 2000-256085 | 9/2000 |

* cited by examiner

GLASS LAYERED CERAMIC PRODUCT

TECHNICAL FIELD

The first invention relates to a process for stain resistant treatment and a product having a glass layer. The second invention relates to a reinforced ceramic product and a process for producing the same. The third invention relates to a product having a glass layer and a process for producing the same.

BACKGROUND ART

It has been known that antibacterial metals, for example, Ag, Cu, Zn and the like, have an antibacterial activity. Therefore, in the case where a product having a glass layer, such as a ceramic product, an enameled product and the like, having an antibacterial activity is to be produced, a process for stain resistant treatment is carried out, which has an antibacterial treatment step of imparting antibacterial function to a surface of a base body, such as a glass molded article, a ceramic molded article, a metallic molded article and the like. The antibacterial treatment step of the process for stain resistant treatment contains a preparation step of preparing a glazing material capable of forming a glass layer containing an antibacterial metal, and a vitrification step of forming a glazing material layer formed with the glazing material on the surface of the base body and melting the glazing material layer to form a glass layer.

According to the process for stain resistant treatment, a product is obtained that comprises a base body having a glass layer, and the glass layer comprises the glazing material. In the product having a glass layer thus obtained, the antibacterial metal in the glass layer can affect bacteria to kill them or to suppress propagation thereof.

An ordinary ceramic product comprises a ceramic main body and a glass layer formed on the surface of the ceramic main body.

The ceramic product is produced roughly in the following manner. As a preparation step, a base material that can form a ceramic main body and a glazing material that can form a glass layer on the surface of the ceramic main body are prepared. As a glazing step, a glazing material layer comprising the glazing material is formed on the surface of the base material. Thereafter, as a baking step, the base material and the glazing material layer are baked to obtain a ceramic product comprising the ceramic main body and the glass layer.

In the ceramic product thus obtained, the glass layer finishes the surface being smooth and fine, and makes the surface being difficult to be damaged and having water-proofing property.

Furthermore, ceramic materials used as products, such as table wares, kitchen equipments, ornamental articles, tiles, sanitary goods, electric equipments, physical and chemical equipments, industrial equipments, roof tiles, ceramic pipes and the like, comprise a ceramic main body as a base body and a glass layer formed on the surface of the ceramic main body. Enameled product comprises a metallic main body as a base body and a glass layer formed on the surface of the metallic main body. Further, part of glass products comprises a glass main body as a base body and a glass layer formed on the glass main body.

Among the foregoing products having a glass layer, a ceramic material, for example, is produced roughly in the following manner. As a preparation step, a base material that can form a ceramic main body and a glazing material that can form a glass layer on the surface of the ceramic main body are prepared. As a glazing step, a glazing material layer comprising the glazing material is formed on the surface of the base material. Thereafter, as a baking step, the base material and the glazing material layer are baked to obtain a ceramic product comprising the ceramic main body and the glass layer. In the product, the glass layer is finished to have a surface being smooth and fine, the surface is difficult to suffer formation of flaws, and water-proofing property is imparted.

DISCLOSURE OF THE INVENTION (First Invention)

However, because a single glass layer is only formed on the surface of the base body in the ordinary process for stain resistant treatment, exertion of the antibacterial function to bacteria on the surface of the glass layer is naturally expected, but the antibacterial metal is dispersed in the glass layer. Therefore, in a product having the glass layer thus obtained, the effect thereof is low unless the concentration of the antibacterial metal is increased. Accordingly, in the process for stain resistant treatment, a large amount of the antibacterial metal is consumed to exhibit the excellent antibacterial function to cause increase of the production cost.

The first invention has been developed under the circumstances of the conventional art, and an object to be attained thereby is to produce a product having a glass layer that can be produced at a low cost and can exhibit excellent antibacterial function.

The process for stain resistant treatment of the first invention is a process for stain resistant treatment comprising an antibacterial treatment step of imparting antibacterial function to a surface of a base body, characterized in that the antibacterial treatment step comprises a preparation step of preparing the base body, a first glazing material capable of forming a first glass layer on a surface of the base body, and a second glazing material capable of forming a second glass layer containing an antibacterial metal on the surface of the base body, and a vitrification step of forming a first glazing material layer comprising the first glazing material on a surface of the base body and, on a yet surface side, a second glazing material layer comprising the second glazing material, and melting the first glazing material layer and the second glazing material layer to form the first glass layer and the second glass layer, and the second glazing material layer has a higher viscosity upon melting than the first glazing material layer.

In the process for stain resistant treatment of the first invention, as a preparation step of an antibacterial treatment step, a base body, a first glazing material capable of forming a first glass layer on a surface of the base body and a second glazing material capable of forming a second glass layer containing an antibacterial metal on the surface of the base body are prepared. As a vitrification step of an antibacterial treatment step, a first glazing material layer comprising the first glazing material on a surface of the base body and, on a yet surface side, a second glazing material layer comprising the second glazing material are formed on a surface of the base body, and the first glazing material layer and the second glazing material layer are melted to form the first glass layer and the second glass layer.

Herein, because the viscosity upon melting of the second glazing material layer is higher than the first glazing material layer, the antibacterial metal is difficult to be diffused from the second glass layer on the surface side into the first glass layer, and almost all thereof stays in the second glass layer.

Therefore, in the process for stain resistant treatment, even when a large amount of an antibacterial metal is not consumed, the antibacterial metal in the second glass layer affects bacteria as naturally expected, so as to exhibit excellent antibacterial function.

Furthermore, in the process for stain resistant treatment of the first invention, the first glazing material layer comprising the first glazing material and, on a yet surface side, the second glazing material layer comprising the second glazing material layer are formed, and the first glazing material layer and the second glazing material layer are melted to form the first glass layer and the second glass layer, and thus in the resulting product, the second glazing material is impregnated into the first glazing material layer, whereby the first glass layer and the second glass layer are firmly adhered, and formation of cracks growing at an interface between them can be prevented. Furthermore, according to the procedure, the baking step can be completed all at once to realize reduction in production cost.

Therefore, according to the process for stain resistant treatment, production can be carried out at a low cost, and a product having a glass layer that can exhibit excellent antibacterial function can be produced.

The product having a glass layer of the first invention is thus obtained in the foregoing manner. The product having a glass layer of the first invention comprises a base body having a glass layer, and the glass layer comprises a first glass layer comprising a first glazing material and a second glass layer formed on a yet outer side of the first glass layer and comprising a second glazing material containing an antibacterial metal and being different from the first glazing material.

As for the base body, in the case where a glass product is produced as the product having a glass layer, the glass molded article can be employed; in the case where a ceramic material, such as sanitary ceramic wares, tiles and the like, is produced, the ceramic molded article can be employed; and in the case where an enameled product is produced, the metallic molded article can be employed.

As the antibacterial metal contained in the second glazing material, Ag, Cu, Zn and the like can be employed. Specific examples include an organic silver or copper compound and a silver or copper carrying inorganic compound, and (1) silver, copper and a silver-copper alloy; (2) silver phosphate, silver nitrate, silver chloride, silver sulfide, silver oxide, silver sulfate, silver citrate and silver lactate; (3) cuprous phosphate, cupric phosphate, an organic copper compound, cuprous chloride, cupric chloride, cuprous sulfide, cuprous oxide, cupric oxide, cupric sulfide, cuprous sulfate, cupric sulfate, copper citrate and copper lactate; and the like. As for zinc, an organic zinc compound and a zinc carrying inorganic compound are similarly exemplified, and zinc, zinc oxide, zinc chloride, zinc sulfide, zinc sulfate, zinc lactate and the like can be employed. These antibacterial metals may be an elemental substance or an alloy, and also may be a compound.

In the product having a glass layer of the first invention, the first glass layer and the second glass layer preferably have a difference in thickness of from 10/1 to 30/1. According to the configuration, even in the case where the appearance of the second glass layer is poor due to the inclusion of the antibacterial metal, such as Ag and the like, in the second glass layer, for example, such a surface is obtained that has substantially no difference on appearance from the case where only the first glass layer is formed, and a product having an appearance of the surface that is excellent in design can be obtained.

According to the results of experiment by the inventors, in the product having a glass layer of the first invention, the second glass layer a larger amount of potassium and a smaller amount of sodium than the first glass layer. Potassium has a larger ionic radius than sodium. Therefore, it is considered that upon forming the glass layer of the product of the first invention, sodium ions in the second glass layer are ion-exchanged by potassium ions in the first glass layer to cause a compression stress in the second glass layer, whereby the strength of the second glass layer is increased.

Furthermore, in the process for stain resistant treatment of the first invention, it is preferred that the second glazing material contains a phosphoric acid compound. In the product having a glass layer of the first invention thus obtained, a phosphoric acid compound, such as $P_2O_5$ and the like, is present in the second glass layer, and thus the antibacterial function owing to the antibacterial metal is more liable to be exhibited. It is also preferred that a boric acid compound is contained in the second glazing material. According to the configuration, a boric acid compound, such as $B_2O_3$ and the like, is present in the second glass layer, and thus the antibacterial function owing to the antibacterial metal is more liable to be exhibited.

The process for stain resistant treatment of the first invention preferably comprises a water repellent treatment step of subjecting the surface of the second glass layer to a water-repellent treatment. According to the configuration, both the antibacterial function and the water repellent function are imparted to the surface of the second glass layer, and thus in the case where water containing a large amount of stain components, to which the stain resistant effect is insufficient only by the antibacterial function, is applied, the stain is difficult to remain owing to the water repellent function, whereby the stain resistant effect is sufficiently exerted.

In this case, the water repellent treatment step can be carried out by forming a film comprising a water repellent treatment liquid having silicon-containing functional groups that are bonded to hydroxyl groups present on the surface of the second glass layer through a dehydration reaction or a dehydrogenation reaction. When the treatment is carried out, the silicon-containing functional groups are bonded to the hydroxyl groups (—OH) present on the surface of the second glass layer through a dehydration reaction or a dehydrogenation reaction to shield the hydroxyl groups. Therefore, when water containing a large amount of a metallic ion, such as soluble silica and the like, is used, the hydroxyl groups are inactivated and are not bonded to the metallic ion, and thus they are not bonded to such a component as human excrement. In particular, when water containing soluble silica as the metallic ion is used, it is not deposited or difficult to be deposited as silicic acid forming a network structure, and thus stain is difficult to be incorporated. Therefore, when the water repellent treatment liquid contains the silicon-containing functional groups, stain, such as human excrement and the like, is difficult to be adhered to a product used simultaneously with water containing a large amount of a metallic ion, such as soluble silica, and cleaning thereof is easily carried out.

Herein, the water repellent treatment liquid is preferably one having no silicon-containing functional groups bonded to each other. According to the configuration, as the results of experiment by the inventors, stain resistant effects for water scale stain resistance, hairdye stain resistance, wear resistance and alkali resistance are improved. When the silicon-containing groups of the water repellent treatment liquid are bonded to each other, the amount of silicon is increased to deposit silicic acid forming a network structure in the film, and stain is liable to be incorporated therein.

The water repellent treatment liquid preferably has carbon fluoride group at the ends bonded to the silicon-containing functional groups. As the results of experiment by the inventors, when the carbon fluoride groups are incorporated in this manner, the water repellent function is successfully exerted by the small critical surface tension of the carbon fluoride groups, large effects are obtained for water scale stain resistance, hair dye stain resistance and alkali resistance.

Herein, the carbon fluoride group may be $-C_nF_{2n+1}$ (n is a natural number of $1 \leq n \leq 12$). As the results of experiment by the inventors, according to the configuration, because the number of fluorine becomes large, and fluorosilane is bulky, large effects are obtained for water scale stain resistance, hairdye stain resistance, wear resistance and alkali resistance.

The water repellent treatment liquid may be one formed by mixing a first agent and a second agent, in which the first agent is a co-hydrolysis product of a perfluoroalkyl group-containing organic silicon compound and a hydrolyzable group-containing methylpolysiloxane compound in a hydrophilic solvent, and the second agent is a mixture of an organopolysiloxane and a strong acid. Herein, the perfluoroalkyl group-containing organic silicon compound and the hydrolyzable group-containing methylpolysiloxane compound present in the first agent are bonded to the hydroxyl groups present on the surface of the glass layer through a dehydration reaction or a dehydrogenation reaction, so as to be prepared as a component having silicon-containing functional groups for protecting the hydroxyl groups.

The reason why the perfluoroalkyl group-containing organic silicon compound is used as a constitutional component of the first agent is the a large stain resistant effect is also exhibited as a water repellent function owing to the large critical surface tension of the carbon fluoride groups, so as to provide large effects for water scale stain resistance, hairdye stain resistance and alkali resistance. The reason why the hydrolyzable group-containing methylpolysiloxane compound is used as a constitutional component of the first agent is that large effects are obtained for water scale stain resistance, hairdye stain resistance and alkali resistance.

The second agent is a mixture of an organopolysiloxane and a strong acid. The reason why the organopolysiloxane is used as a constitutional component of the second agent is that stain resistant effects are exerted a slip stick stain resistance and wear resistance owing to the small critical surface tension of alkyl groups. The reason why the strong acid is used as a constitutional component of the second agent is that in the case where the stain resistant treatment is carried out by using the water repellent treatment liquid prepared in the manner relating to the first invention, the strong acid effectively acts as a catalyst for bonding the perfluoroalkyl group-containing organic silicon compound and the hydrolyzable group-containing methylpolysiloxane compound as constitutional components in the first agent with the hydroxyl groups on the surface of the glass layer.

When the first agent and the second agent are mixed, it is considered that silanol groups of the co-hydrolysis product react with the organopolysiloxane and the strong acid to form siloxane bonds (Si—O—Si) through a dehydration reaction, so as to form an addition compound of plural molecules intertangled by each other in a complex manner. Therefore, it is considered that the water repellent treatment liquid formed by mixing the first agent and the second agent is not formed from single molecules of the perfluoroalkyl group-containing organic silicon compound, the hydrolyzable group-containing methylpolysiloxane compound, the organopolysiloxane and the like, but is constituted by the addition compound formed by intertangling these molecules in a complex manner, i.e., a kind of polymer, and also the addition compound and the surface of the base body are firmly bound by a chemical bond.

According to the manner, a product having a glass layer of the first invention having a water repellent layer containing a water repellent component on the surface side of the second glass layer. Because the thickness of the water repellent layer is extremely small, and the water repellent layer is bonded only on the hydroxyl group part of the surface of the second glass layer, it is considered that the antibacterial effect penetrates the drain layer.

(Second Invention)

The conventional ceramic product is liable to suffer formation of flaws on the surface thereof, and the surface hardness thereof is insufficient because it has a single glass layer. Therefore, it has such a disadvantage that cracks are liable to occur in the glass layer or the like upon receiving an impact due to the presence of flaws. Particularly, in the case of a ceramic product imparted with an antibacterial function on the surface by impregnating the glass layer with an antibacterial metal, such as Ag and the like, the tendency is expected to be large because it is considered that the antibacterial metal accelerates the growth of cracks. It also has such a disadvantage that stain is liable to be attached to the flaws.

The second invention has been developed under the circumstances of the conventional art, and an object to be attained thereby is to provide a reinforced ceramic product that is difficult to suffer formation of flaws on the surface thereof.

The reinforced ceramic product of the second invention comprises a ceramic product main body and a glass layer formed on a surface of the ceramic product main body, characterized in that the glass layer comprises a first glass layer comprising a first glazing material and a second glass layer comprising a second glazing material that is formed on an outer side of the first glass layer and has a smaller linear thermal expansion coefficient than the first glass layer.

In the reinforced ceramic product of the second invention, because the linear thermal expansion coefficient of the second glass layer is smaller than the linear thermal expansion coefficient of the first glass layer, the second glass layer suffers compression stress due to contraction of the first glass layer through the melting process of the first and second glazing material layers and the cooling process of the first and second glass layers in the baking step. Therefore, the second glass layer is compacted to have a high surface hardness and is difficult to suffer formation of flaws on the surface of the glass layer. Therefore, in the reinforced ceramic product of the second invention, cracks in the glass layer or the like due to the flaws are difficult to be formed. Attachment of stain due to the flaws is also difficult to occur, because the flaws are difficult to be formed.

The reinforced ceramic product of the second invention may have three or more glass layers on the ceramic product main body. For example, in the case where it has three glass layers, the lowermost layer corresponds to the first glass layer, the intermediate layer corresponds to the second glass layer and simultaneously corresponds to the first glass layer with respect to the upper layer, and the upper layer corresponds to the second glass layer.

In the reinforced ceramic product of the second invention, it is preferred that the ceramic product main body has a larger linear thermal expansion coefficient than the first glass layer. According to the configuration, not only the second glass layer receives compression stress from the first glass layer, but also the first glass layer receives compression stress from the ceramic product main body through the sintering process of the base material, the melting process of the glazing material layers and the cooling process of the ceramic product main body and the glass layers in the baking step, whereby not only the second glass layer but the first glass layer are compacted. Therefore, in the reinforced ceramic product of the second invention, cracks in the glass layer or the like due to the flaws are difficult to be formed.

In the reinforced ceramic product of the second invention, it is preferred that the first glass layer and the second glass layer have a difference in linear thermal expansion coefficient of from $1\times10^{-7}$ to $1\times10^{-6}$/° C. In the case where the difference in thermal expansion coefficient between the first glass layer and the second glass layer is smaller than the range, a desired surface hardness cannot be obtained, and on the other hand, it is larger than the range, the compression stress received by the second glass layer from the first glass layer becomes too large to cause possibility of breakage of the second glass layer. In particular, according to the results of experiment by the inventors, it is practical that the first glass layer and the second glass layer have a difference in linear thermal expansion coefficient of from $2\times10^{-7}$ to $5\times10^{-7}$/° C.

In this case, it is preferred that the first glass layer and the second glass layer have a difference in thickness of from 10/1 to 30/1. According to the configuration, even in the case where the appearance of the second glass layer is poor due to the inclusion of the antibacterial metal, such as Ag and the like, in the second glass layer, such a surface is obtained that has substantially no difference on appearance from the case where only the first glass layer is formed, and a reinforced ceramic product having an appearance of the surface that is excellent in design can be obtained.

Depending on the composition and the thickness of the second glass layer, interference of light on the interface with the first glass layer is difficult to be formed, and thus iridescent can also be prevented. Further, depending on the composition of the second glass layer, the second glass layer is formed as a crystallized vitreous material to make it opaque.

It is preferred that the ceramic product main body and the first glass layer have a difference in linear thermal expansion coefficient of from $1\times10^{-7}$ to $1\times10^{-6}$/° C. In the case where the difference in thermal expansion coefficient between the ceramic product main body and the first glass layer is smaller than the range, a desired strength cannot be obtained, and on the other hand, it is larger than the range, the compression stress received by the first glass layer from the ceramic product main body becomes too large to cause possibility of breakage of the first glass layer. In particular, according to the results of experiment by the inventors, it is practical that the ceramic product main body and the first glass layer have a difference in linear thermal expansion coefficient of from $2\times10^{-7}$ to $5\times10^{-7}$/° C.

According to the results of experiment by the inventors, in the reinforced ceramic product of the second invention, the second glass layer contains a larger amount of potassium and a smaller amount of sodium than the first glass layer. Potassium has a larger ionic radius than sodium. Therefore, it is considered that upon forming the glass layers of the ceramic product of the second invention, sodium ions in the second glass layer are ion-exchanged by potassium ions in the first glass layer to cause a compression stress in the second glass layer, whereby the strength of the second glass layer is increased.

In the case where an antibacterial metal is dispersed throughout a single glass layer to impart antibacterial function to a ceramic product, the antibacterial metal is liable to sequester the vitreous material, and thus cracks are liable to grow through the antibacterial metal. Therefore, the reinforced ceramic product of the second invention exhibit a larger effect when the second glass layer contains an antibacterial metal. According to the configuration, because the second glass layer containing the antibacterial metal is compacted, growth of cracks in the second glass layer through the antibacterial metal can be prevented. In the reinforced ceramic product of the second invention, since the antibacterial metal is contained only in the second glass layer among the glass layers, the concentration of the antibacterial metal on the surface side can be increased even when a smaller amount of the antibacterial metal than the conventional product is employed, where by higher antibacterial function can be exerted. Further, unnecessary consumption of the antibacterial metal can be prevented.

As the antibacterial metal herein, those similar to the first invention can be employed.

Furthermore, in the reinforced ceramic product of the second invention, it is preferred that a water repellent layer containing a water repellent component is formed on the surface side of the second glass layer. According to the configuration, even when water containing a large amount of stain components is applied to the surface having a slight amount of flaws, the stain is difficult to remain owing to the water repellent function to exhibit excellent stain resistant effect.

In this case, the same water repellent treatment step as in the first invention can be carried out.

The process for producing a reinforced ceramic product of the second invention comprises a preparation step of preparing a base material capable of forming a ceramic product main body and a glazing material capable of forming a glass layer on a surface of the ceramic product main body, a glazing step of forming a glazing material layer comprising the glazing material on a surface of the base material, and a baking step of baking the base material and the glazing material layer to obtain a ceramic product comprising the ceramic product main body and the glass layer, characterized in that the glazing material comprises a first glazing material that is formed on a side of the base material and forms a first glass layer, and a second glazing material that is formed on an outer side and forms a second glass layer having a smaller linear thermal expansion coefficient than the first glass layer. The reinforced ceramic product of the second invention can be produced by the production process of the second invention.

In the process for producing a reinforced ceramic product of the second invention, it is possible in the glazing step that a first glazing material layer comprising the first glazing material is formed, and then a second glazing material layer comprising the second glazing material is formed on the first glazing material layer. In the reinforced ceramic product of the second invention thus obtained, the first glazing material is impregnated into the surface side of the base material since the first glazing material is glazed on the base material to form a first glazing material layer, and the first glazing material impregnated into the base material also forms the first glass layer inside the ceramic product formed of the base material. Therefore, the first glass layer is firmly adhered on the ceramic product main body. Further, in the reinforced ceramic product, because the second glazing material is glazed on the first glazing material layer to form the second glazing material layer, the second glazing material is impregnated into the first glazing material layer, whereby the first glass layer and the second glass layer are firmly adhered, and also the formation of cracks growing at the interface thereof can be prevented. According to the configuration, the baking step can be completed all at once, and reduction in production cost can be realized.

Furthermore, in the process for producing a reinforced ceramic material of the second invention, it is preferred that the first glazing material contains potassium, and the second glazing material contains sodium. Because potassium has a larger ionic radius than sodium, sodium ions in the second glazing material are ion-exchanged by potassium ions in the first glazing material by using these first and second glazing materials. Accordingly, a reinforced ceramic material of the second invention can be obtained that has the second glass layer containing a larger amount of potassium and a smaller amount of sodium than the first glass layer.

In the process for producing a reinforced ceramic product of the second invention, it is possible that the second glazing material contains an antibacterial metal. According to the configuration, a reinforced ceramic product imparted with antibacterial function can be produced.

Furthermore, in the process for producing a reinforced ceramic product of the second invention, it is possible that the second glazing material has a higher viscosity upon melting than the first glazing material. According to the configuration, degasification upon baking is smoothly carried out, whereby blister of the reinforced ceramic product can be prevented, and also the rate of diffusion of the antibacterial metal from the second glass layer to the first glass layer upon baking is decreased, so as to produce a reinforced ceramic product having the concentration of the antibacterial metal on the surface that is maintained at a high level.

Furthermore, the process for producing a reinforced ceramic product of the second invention may have a water repellent treatment step of subjecting the surface of the glass layer to a water repellent treatment. According to the configuration, such a reinforced ceramic product can be obtained that stain is difficult to remain.

(Third Invention)

A conventional product having a glass layer is liable to suffer formation of flaws on the surface thereof, and the surface hardness thereof is insufficient because the glass layer is a single layer. Therefore, it has such a disadvantage that cracks are liable to occur in the glass layer or the like upon receiving an impact due to the presence of flaws. It also has such a disadvantage that stain is liable to be attached to the flaws. Therefore, it is considered to employ a glass layers of plural layers. However, it has been found that a product simply using a glass layer of plural layers is still liable to suffer formation of flaws, and the surface hardness thereof is insufficient. Accordingly, it has such a disadvantage that it lacks stain resistance.

The third invention has been developed under the circumstances of the conventional art, and an object to be attained thereby is to provide a product having a glass layer that is difficult to suffer formation of flaws on the surface thereof and thus certainly exerts excellent stain resistance.

The product having a glass layer of the third invention comprises a base body and a glass layer formed on a surface of the base body, characterized in that the glass layer comprises a first glass layer comprising a first glazing material and a second glass layer comprising a second glazing material that is formed on an outer side of the first glass layer and has a smaller linear thermal expansion coefficient than the first glass layer, and hard fine particles are dispersed on a surface of the second glass layer.

In the product having a glass layer of the third invention, because the linear thermal expansion coefficient of the second glass layer is smaller than the linear thermal expansion coefficient of the first glass layer, the second glass layer suffers compression stress due to contraction of the first glass layer through the melting process of the first and second glazing material layers and the cooling process of the first and second glass layers in the baking step. Therefore, the second glass layer is compacted to have a high surface hardness and is difficult to suffer formation of flaws on the surface of the glass layer. Further, cracks in the glass layer or the like due to the flaws are difficult to be formed. Therefore, in the product of the third invention, stain due to flaws and cracks is difficult to be attached, and excellent stain resistance can be exerted.

Particularly, in the case where the product of the third invention is exposed to external factors that damages the surface of the second glass layer, the hard fine particles present on the surface prevent abrasion of the factors on the surface of the second glass layer. Therefore, even when the factors abrade the surface of the second glass layer, the period of time thereof is short, and heavy flaws are difficult to be formed. Therefore, in the product of the third invention, stain is difficult to be attached, and excellent stain resistance is exerted.

In the product of the third invention, because the linear thermal expansion coefficient of the second glass layer is smaller than the linear thermal expansion coefficient of the first glass layer, pinholes are difficult to be formed in the second glass layer. Therefore, the product has higher smoothness and realizes excellent stain resistance.

The product having a glass layer of the third invention may have a three or more glass layers on the base body. For example, in the case where it has three glass layers, the intermediate layer corresponds of the first glass layer, and the upper layer corresponds to the second glass layer.

As the hard fine particles used in the product having a glass layer of the third invention, metallic fine particles and inorganic material fine particles, such as silicon nitride fine particles and the like, can be employed. The hard fine particles preferably have an average particle diameter of from 0.8 to 20 µm. According to the configuration, the forgoing flaw formation resistance is exhibited, and good appearance of the product having a glass layer can be maintained.

According to the results of experiment by the inventors, zircon fine particles are preferably employed. Zircon fine particles have such nature that is harder than the forgoing factors that form flaws on the surface of the second glass layer. As such factors, a brash and an abrasive for cleansing is considered. The factors are scraped by the zircon fine particles, and thus the factors are difficult to form flaws on the second glass layer.

The zircon fine particles exert flaw formation resistance as described in the foregoing, but on the other hand, they impair smoothness of the surface of the second glass layer and influence coloration of the second glass layer, depending on the proportion contained in the second glass layer. Therefore, the proportion of the zircon fine particles contained in the second glass layer is preferably from 0.5 to 2% by weight.

In the product having a glass layer of the third invention, it is preferred that the base body has a larger linear thermal expansion coefficient than the first glass layer. According to the configuration, not only the second glass layer receives compression stress from the first glass layer, but also the first glass layer receives compression stress from the base body through the sintering process of the base body, the melting process of the glazing material layers and the cooling process of the base body and the glass layers in the baking step, whereby not only the second glass layer but the first glass layer are compacted. Therefore, in the product having a glass layer of the third invention, cracks in the glass layer or the like are difficult to be formed.

In the product having a glass layer of the third invention, it is preferred that the first glass layer and the second glass layer have a difference in linear thermal expansion coefficient of from $1\times10^{-7}$ to $1\times10^{-6}/°$ C. In the case where the difference in thermal expansion coefficient between the first glass layer and the second glass layer is smaller than the range, a desired surface hardness cannot be obtained, and on the other hand, it is larger than the range, the compression stress received by the second glass layer from the first glass layer becomes too large to cause possibility of breakage of the second glass layer. In particular, according to the results of experiment by the inventors, it is practical that the first glass layer and the second glass layer have a difference in linear thermal expansion coefficient of from $2\times10^{-7}$ to $5\times10^{-7}/°$ C.

In this case, it is preferred that the first glass layer and the second glass layer have a difference in thickness of from 10/1 to 30/1. According to the configuration, even in the case where the appearance of the second glass layer is poor due to the inclusion of the antibacterial metal, such as Ag and the like, in the second glass layer, such a surface is obtained that has substantially no difference on appearance from the case where only the first glass layer is formed, and a product having a glass layer having an appearance of the surface that is excellent in design can be obtained.

Depending on the composition and the thickness of the second glass layer, interference of light on the interface with the first glass layer is difficult to be formed, and thus iridescent can also be prevented. Further, depending on the composition of the second glass layer, the second glass layer is formed as a crystallized vitreous material to make it opaque.

It is preferred that the base body and the first glass layer have a difference in linear thermal expansion coefficient of from $1\times10^{-7}$ to $1\times10^{-6}/°$ C. In the case where the difference in thermal expansion coefficient between the base body and the first glass layer is smaller than the range, a desired strength cannot be obtained, and on the other hand, it is larger than the range, the compression stress received by the first glass layer from the base body becomes too large to cause possibility of breakage of the first glass layer. In particular, according to the results of experiment by the inventors, it is practical that the base body and the first glass layer have a difference in linear thermal expansion coefficient of from $2\times10^{-7}$ to $5\times10^{-7}/°$ C.

According to the results of experiment by the inventors, in the product having a glass layer of the third invention, the second glass layer contains a larger amount of potassium and a smaller amount of sodium than the first glass layer. Potassium has a larger ionic radius than sodium. Therefore, it is considered that upon forming the glass layers of the product having a glass layer of the third invention, sodium ions in the second glass layer are ion-exchanged by potassium ions in the first glass layer to cause a compression stress in the second glass layer, whereby the strength of the second glass layer is increased.

The product having a glass layer of the third invention has large stain resistant effect in the case where an antibacterial metal is contained in the second glass layer. In particular, in the product having a glass layer of the third invention, since the antibacterial metal is contained only in the second glass layer among the glass layers, the concentration of the antibacterial metal on the surface side can be increased even when a smaller amount of the antibacterial metal than the conventional product is employed, whereby higher antibacterial function can be exerted. Further, unnecessary consumption of the antibacterial metal can be prevented.

As the antibacterial metal herein, those similar to the first and second inventions can be employed.

Furthermore, in the product having a glass layer of the third invention, it is preferred that a water repellent layer containing a water repellent component is formed on the surface side of the second glass layer. According to the configuration, even when water containing a large amount of stain components is applied to the surface having a slight amount of flaws, the stain is difficult to remain owing to the water repellent function to exhibit excellent stain resistant effect.

In this case, the same water repellent treatment step as in the first and second inventions can be carried out.

In the product having a glass layer of the third invention, the base body may be a ceramic product main body. The product of this case is a ceramic product, such as a lavatory bowl, a lavatory sink and the like. These ceramic products particularly require the effect because they are often washed with a brash by using a cleanser containing water and an abrasive.

The process for producing a product having a glass layer of the third invention comprises a preparation step of preparing a base body and a glazing material capable of forming a glass layer on a surface of the base body, a glazing step of forming a glazing material layer comprising the glazing material on a surface of the base body, and a baking step of baking the base body and the glazing material layer to obtain a product comprising the base body and the glass layer, characterized in that the glazing material comprises a first glazing material that is formed on a side of the base body and forms a first glass layer, and a second glazing material that is formed on an outer side and forms a second glass layer that has a smaller linear thermal expansion coefficient than the first glass layer and has hard fine particles dispersed on a surface. The product having a glass layer of the third invention can be produced by the production process of the third invention.

In the process for producing a product having a glass layer of the third invention, it is possible in the glazing step that a first glazing material layer comprising the first glazing material is formed, and then a second glazing material layer comprising the second glazing material is formed on the first glazing material layer. In the product having a glass layer of the third invention thus obtained, the first glazing material is impregnated into the surface side of the base body since the first glazing material is glazed on the base body to form a first glazing material layer, and the first glazing material impregnated into the base body also forms the first glass layer inside the base body. Therefore, the first glass layer is firmly adhered on the base body. Further, in the base body, because the second glazing material is glazed on the first glazing material layer to form the second glazing material layer, the second glazing material is impregnated into the first glazing material layer, whereby the first glass layer and the second glass layer are firmly adhered, and also the formation of cracks growing at the interface thereof can be prevented. According to the configuration, the baking step can be completed all at once, and reduction in production cost can be realized.

Furthermore, in the process for producing a product having a glass layer of the third invention, it is preferred that the first glazing material contains potassium, and the second glazing material contains sodium. Because potassium has a larger ionic radius than sodium, sodium ions in the second glazing material are ion-exchanged by potassium ions in the first glazing material by using these first and second glazing materials. Accordingly, a product having a glass layer of the third invention can be obtained that has the second glass layer containing a larger amount of potassium and a smaller amount of sodium than the first glass layer.

In the process for producing a product having a glass layer of the third invention, it is possible that the second glazing material contains an antibacterial metal. According to the configuration, a product having a glass layer imparted with antibacterial function can be produced.

Furthermore, in the process for producing a product having a glass layer of the third invention, it is possible that the second glazing material has a higher viscosity upon melting than the first glazing material. According to the configuration, aggregation of the hard fine particles dispersed in the second glass layer can be prevented, and thus the hard fine particles can be present in such a state that they are suitably dispersed on the surface. Further, degasification upon baking is smoothly carried out, whereby blister of the ceramic product can be prevented, and also the rate of diffusion of the antibacterial metal from the second glass layer to the first glass layer upon baking is decreased, so as to produce a product having a glass layer having the concentration of the antibacterial metal on the surface that is maintained at a high level.

Furthermore, the process for producing a product having a glass layer of the third invention may have a water repellent treatment step of subjecting the surface of the glass layer to a water repellent treatment. According to the configuration, such a product having a glass layer can be obtained that stain is difficult to remain.

BEST MODE FOR CARRYING OUT THE INVENTION (First Invention)

Example practicing the first invention and Comparative Examples 1 and 2 will be described below along with FIGS. 1 to 5.

EXAMPLE

"Preparation Step" of "Antibacterial Treatment Step"

Figure 1:
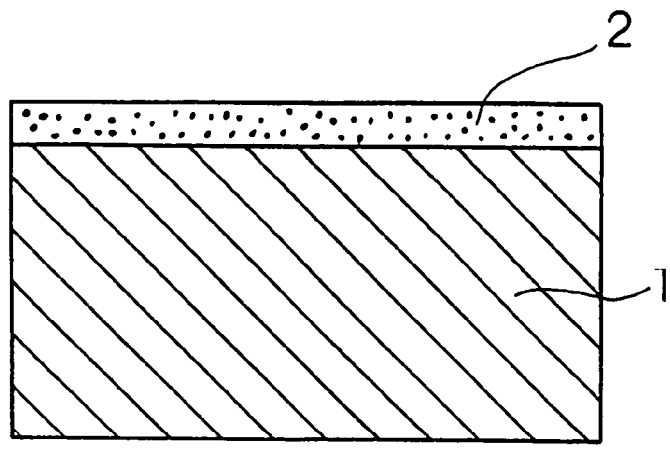
FIG. 1 is a cross sectional view of a base body and a first glazing material layer of Example relating to the first invention.
Figure 2:
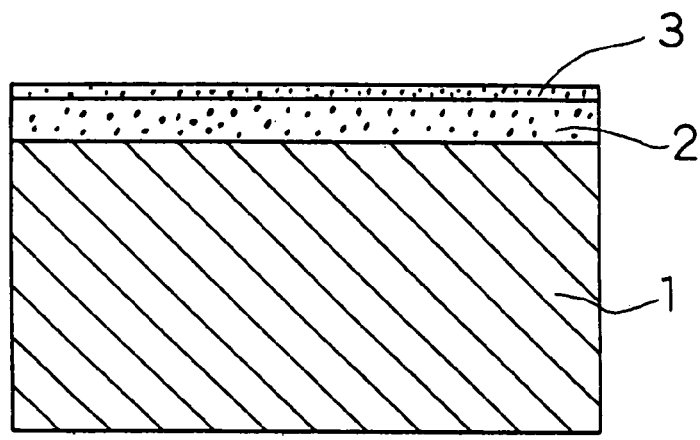
FIG. 2 is a cross sectional view of a base body, a first glazing material layer and a second glazing material layer of Example relating to the first invention.

A base material for tiles of the following composition is prepared as a ceramic molded article, and the base material for tiles is cut into a quadrate of 50±2 mm square (thickness: 10 mm or less), which is designated as a base body 1 shown in FIG. 1 and FIG. 2.

| (Blending Proportions for Base Material for Tiles (% by mass)) | |
|---|---|
| Feldspar | 28.2 |
| Silica sand | 11.8 |
| Sericite | 15.0 |
| Clay | 45.0 |

A first glazing material and a second glazing material having the following compositions are prepared.

| (Blending Proportions for First Glazing Material (% by mass)) | |
|---|---|
| Feldspar | 35.0 |
| Silica sand | 46.9 |
| Lime | 15.9 |
| Clay | 2.2 |

The first glazing material contains 2% by mass of $K_2O$.

| (Blending Proportions for Second Glazing Material (% by mass)) | |
|---|---|
| Silica sand | 31.0 |
| Lime | 6.0 |
| Clay | 13.0 |
| Antibacterial agent | 50.0 |

The antibacterial agent has the following composition (% by mass).

| | |
|---|---:|
| $Ag_2O$ | 25.88 |
| $P_2O_5$ | 4.98 |
| CaO | 0.01 |
| $SiO_2$ | 56.84 |
| $Al_2O_3$ | 9.36 |
| $Fe_2O_3$ | 0.10 |
| $K_2O$ | 0.43 |
| $Na_2O$ | 0.06 |
| SrO | 0.01 |
| Ignition loss | 2.34 |

The second glazing material contains 2% by mass of $Na_2O$.

"Vitrification Step" of "Antibacterial Treatment Step"

As shown in FIG. 1, the first glazing material is glazed on the surface of the base body 1 to form a first glazing material layer 2, and then as shown in FIG. 2, the second glazing material is glazed on the surface side of the first glazing material layer 2 to form a second glazing material layer 3.

Figure 3:
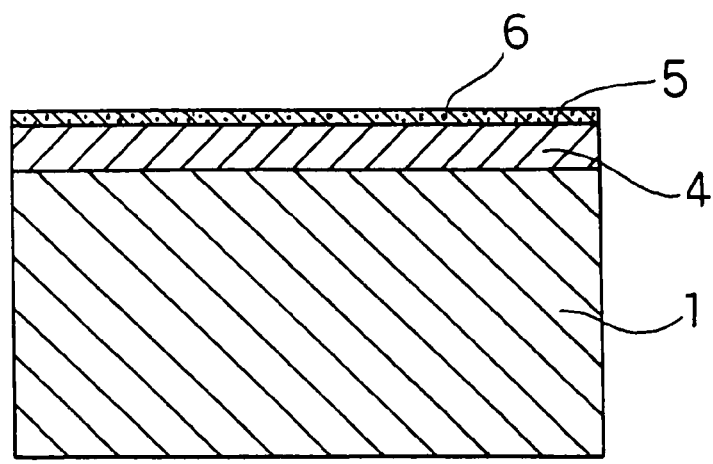
FIG. 3 is a cross sectional view of a base body, a first glass layer and a second glass layer of Example relating to the first invention.

The base body 1 having the first glazing material layer 2 and the second glazing material layer 3 is baked at 1,210° C. According to the procedure, the first glazing material layer 2 and the second glazing material layer 3 are melted to form a first glass layer 4 and a second glass layer 5 on the base body 1 as shown in FIG. 3.

Herein, since the second glazing material layer 3 has a higher viscosity upon melting than the first glazing material layer 2, most of a silver compound 6 added to the second glazing material as an antibacterial metal stays in the second glass layer 5. Furthermore, the first glass layer 4 and the second glass layer 5 have a difference in thickness of 20/1.

"Water Repellent Treatment Step"

Thereafter, a water repellent treatment step is carried out on the surface of the second glass layer 5.

A first agent is prepared, which is formed with $C_8F_{17}CH_2CH_2Si(OCH_3)_3$ as a perfluoroalkyl group-containing organic silicon compound and $Si(CH_3O)_3CH_2CH_2$—$(Si(CH_3)_2O)_{10}$—$Si(CH_3)_2CH_2CH_2Si(OCH_3)_3$ as a hydrolyzable group-containing polymethylsiloxane compound, which are co-hydrolyzed in a hydrophilic solvent containing 0.1N aqueous hydrochloric acid, t-butanol and hexane. It is considered that they contain silanol (Si—OH) groups respectively.

A mixture of polyorganosiloxane (HO—$(Si(CH_3)_2O)_{30}$—$Si(CH_3)_2OH$) and methanesulfonic acid as a strong acid is prepared as a second agent.

5 ml of the second agent is added to and mixed with 5 ml of the first agent to form a water repellent treatment liquid. The water repellent treatment liquid is coated on the surface of the second glass layer 5 to form a film. Thereafter, it is allowed to stand for about 10 minutes to dry it. Thereafter, the surface is washed with ethanol and dried.

Figure 4:
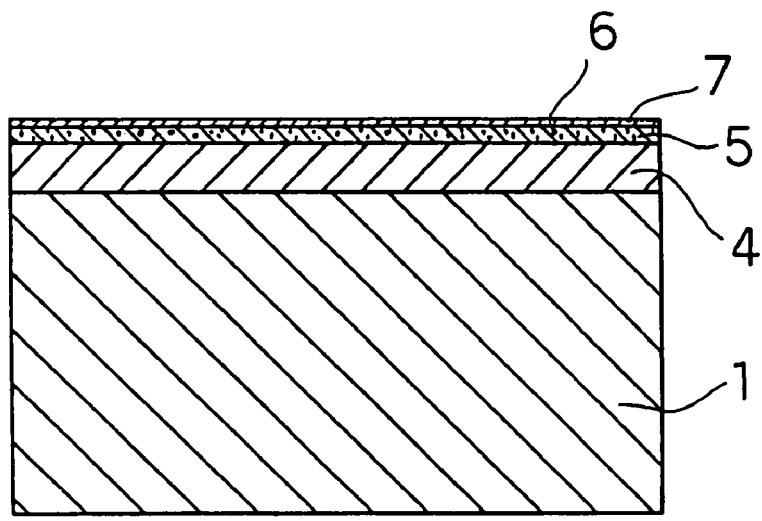
FIG. 4 is a cross sectional view of a base body, a first glass layer, a second glass layer and a water repellent layer of Example relating to the first invention.

Through the foregoing procedures, as shown in FIG. 4, a sample is obtained, which comprises the base body 1, the first glass layer 4 comprising the first glazing material formed on the base body 1, the second glass layer 5 comprising the second glazing material, which is different from the first glazing material, containing the antibacterial metal and formed on the outer side of the first glass layer 4, and a water repellent layer 7 containing the water repellent component formed on the surface side of the second glass layer 5.

In the sample of Example, because the first glass layer 4 and the second glass layer 5 have a difference in thickness of 20/1, such a surface is obtained that has substantially no difference on appearance from the case where only the first glass layer 4 is formed, and the surface having an appearance that is excellent in design is obtained, even though the second glass layer 5 itself has poor appearance due to the inclusion of the silver compound 6.

Comparative Example 1

Figure 5:
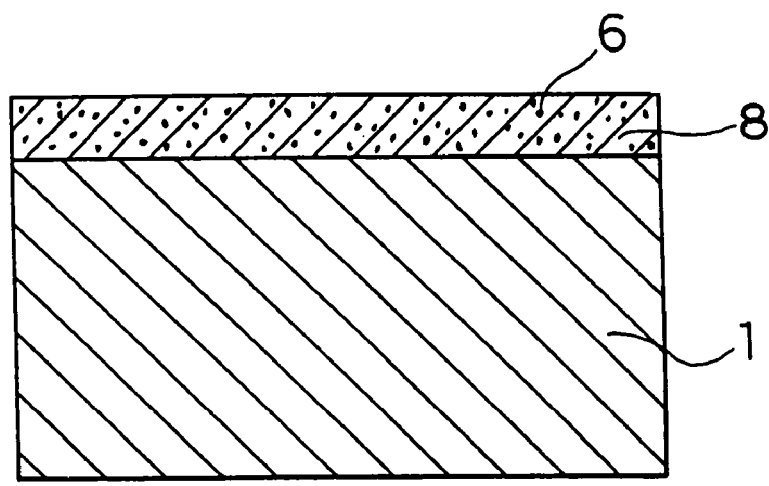
FIG. 5 is a cross sectional view of a base body and a glass layer of Comparative Examples 1 and 2 relating to the first invention.

As shown in FIG. 5, a glazing material having the following composition is glazed on a base material of the same kind as Example to form a glazing material layer.

| (Blending Proportions for Glazing Material (% by mass)) | |
|---|---:|
| Feldspar | 53.7 |
| Silica sand | 9.8 |
| Lime | 12.3 |
| Dolomite | 4.8 |
| Gairome clay | 5.1 |
| Zinc white | 2.0 |
| Zircon | 10.1 |
| Silicate frit | 2.2 |

0.5% by mass in terms of outside account of silver powder (purity: 99% or more, average particle diameter 10 μm) is added to the blend to form a glazing material.

The base body 1 having the glazing material layer is baked at 1,210° C. According to the procedures, the glazing material layer is melted to form a glass layer 8 on the base body 1 as shown in FIG. 5. Thus, a sample is obtained, which comprises the base body 1 and a glass layer 8 containing the antibacterial metal and comprising the glazing material, which is formed on the base body 1.

Comparative Example 2

A glazing material having a concentration of the silver powder in the glazing material of 5.0% by mass, which is 10 times that of Comparative Example 1, is used. The others, the process for stain resistant treatment and the constitution of the sample, are the same as Comparative Example 1.

(Evaluation)

Three pieces each of the samples of Example and Comparative Examples 1 and 2 are prepared and subjected to an antibacterial performance test by the film method. The results are shown in Table 1.

TABLE 1

| | *Esherichia coli* (IFO3972) | | | *Staphylococcus aureus* (IFO12732) | | |
|---|---|---|---|---|---|---|
| Nutrition concentration | Example | Comparative Example 1 | Comparative Example 2 | Example | Comparative Example 1 | Comparative Example 2 |
| 1/500 NB | 5.5 | 2.8 | 4.0 | 4.8 | 2.3 | 3.2 |
| 1/200 NB | 4.2 | 1.4 | 2.5 | 3.7 | 1.1 | 2.1 |
| 1/50 NB | 2.7 | 0.0 | 0.2 | 2.3 | 0.0 | 0.1 |

It is understood from Table 1 that with respect to the antibacterial function for both kinds of bacteria, an average change rate difference of 2.0 or more is maintained even when the nutrition concentration is increased in Example, whereas an average change rate difference of 2.0 or more is maintained only in the case of 1/500 NB or less in Comparative Example 1 and in the case of 1/200 NB or less in Comparative Example 2. Therefore, it is understood that Example is excellent in stain resistant effect in comparison to Comparative Examples 1 and 2 even though the using amount of the silver powder in Example is smaller than those in Comparative Examples 1 and 2.

It is understood from the foregoing that because the silver compound 6 is present in the second glass layer 5 on the surface side in Example, the concentration thereof on the surface becomes high with the same amount of the silver compound 6 in comparison to the case where the antibacterial metal is dispersed over the entire glass layer 8 as in Comparative Examples 1 and 2, whereby excellent antibacterial function is exerted, and unnecessary consumption of the antibacterial metal can also be prevented. In particular, because the phosphoric acid compound is contained in the second glazing material in Example, the antibacterial function owing to the antibacterial metal is liable to be exerted. Further, because the water repellent layer 7 is formed on the surface of the second glass layer 5 in Example, both the antibacterial function and the water repellent function are imparted, and thus even when water containing such a large amount of stain components is used that the stain resistant effect becomes insufficient only by the antibacterial function, the stain is difficult to remain owing to the water repellent function, so as to fully exerting the stain resistant effect.

Therefore, it is understood that according to the process for stain resistant treatment of Example, such a product having a glass layer can be produced that can be produced at low cost and can exhibit excellent antibacterial function.

Further, in the process for stain resistant treatment of Example, degasification upon baking can be smoothly carried out to prevent blister of the sample.

(Second Invention)

Example practicing the second invention and Comparative Example will be described below.

EXAMPLE

"Preparation Step"

A base material for tiles 1 is prepared from the following composition cut into a quadrate of 50±2 mm square (thickness: 10 mm or less).

| (Blending Proportions for Base Material 1 (% by mass)) | |
|---|---|
| Feldspar | 28.2 |
| Silica sand | 11.8 |
| Sericite | 15.0 |
| Clay | 45.0 |

A first glazing material and a second glazing material having the following compositions are prepared.

| (Blending Proportions for First Glazing Material (% by mass)) | |
|---|---|
| Feldspar | 35.0 |
| Silica sand | 46.9 |
| Lime | 15.9 |
| Clay | 2.2 |

The first glazing material contains 2% by mass of $K_2O$.

| (Blending Proportions for Second Glazing Material (% by mass)) | |
|---|---|
| Silica sand | 31.0 |
| Lime | 6.0 |
| Clay | 13.0 |
| Antibacterial agent | 50.0 |

The antibacterial agent has the following composition (% by mass).

| | |
|---|---|
| $Ag_2O$ | 25.88 |
| $P_2O_5$ | 4.98 |
| CaO | 0.01 |
| $SiO_2$ | 56.84 |
| $Al_2O_3$ | 9.36 |
| $Fe_2O_3$ | 0.10 |
| $K_2O$ | 0.43 |
| $Na_2O$ | 0.06 |
| SrO | 0.01 |
| Ignition loss | 2.34 |

The second glazing material contains 2% by mass of $Na_2O$.

"Glazing Step"

Figure 6:
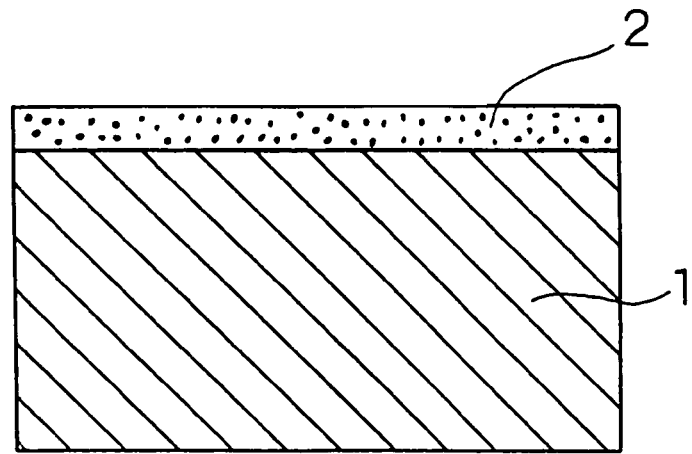
FIG. 6 is a cross sectional view of a base material and a first glazing material layer of Example relating to the second invention.
Figure 7:
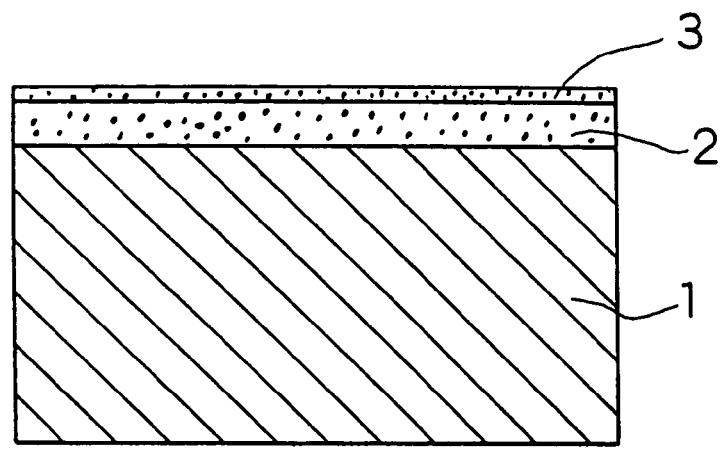
FIG. 7 is a cross sectional view of a base material, a first glazing material layer and a second glazing material layer of Example relating to the second invention.

As shown in FIG. 6, the first glazing material is glazed on the surface of the base material 1 to form a first glazing material layer 2, and then as shown in FIG. 7, the second glazing material is glazed on the surface side of the first glazing material layer 2 to form a second glazing material layer 3.

"Baking Step"

Figure 8:
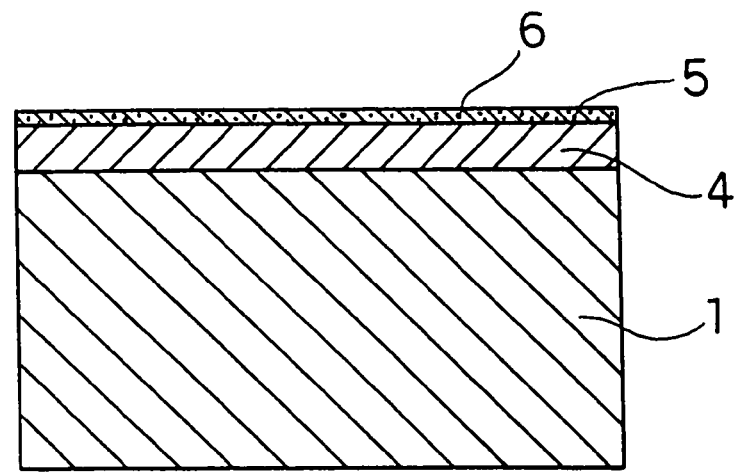
FIG. 8 is a cross sectional view of a ceramic product main body, a first glass layer and a second glass layer of Example relating to the second invention.

The base material 1 having the first glazing material layer 2 and the second glazing material layer 3 is baked at 1,210° C. According to the procedure, the base material 1 is sintered, and the first glazing material layer 2 and the second glazing material layer 3 are melted to form a first glass layer 4 and a second glass layer 5 on a ceramic product main body 1 as shown in FIG. 8.

Herein, the second glass layer 5 has a smaller linear thermal expansion coefficient than the linear thermal expansion coefficient of the first glass layer 4, and the difference therebetween is $3 \times 10^{-7}/°$C. Further, the first glass layer 4 has a smaller linear thermal expansion coefficient than the linear thermal expansion coefficient of the ceramic product main body 1, and the difference therebetween is $4 \times 10^{-7}/°$C. Furthermore, the first glass layer 4 and the second glass layer 5 have a difference in thickness of 20/1. The second glass layer 5 has the silver compound 6 as an antibacterial metal dispersed therein.

"Water Repellent Treatment Step"

The following water repellent treatment step is then carried out on the surface of the second glass layer 5.

A first agent is prepared, which is formed with $C_8F_{17}CH_2CH_2Si(OCH_3)_3$ as a perfluoroalkyl group-containing organic silicon compound and Si(CH$_3$O)$_3$CH$_2$CH$_2$—(Si(CH$_3$)$_2$O)$_{10}$—Si(CH$_3$)$_2$CH$_2$CH$_2$Si(OCH$_3$)$_3$ as a hydrolyzable group-containing polymethylsiloxane compound, which are co-hydrolyzed in a hydrophilic solvent containing 0.1N aqueous hydrochloric acid, t-butanol and hexane. It is considered that they contain silanol (Si—OH) groups respectively.

A mixture of polyorganosiloxane (HO—(Si(CH$_3$)$_2$O)$_{30}$—Si(CH$_3$)$_2$OH) and methanesulfonic acid as a strong acid is prepared as a second agent.

5 ml of the second agent is added to and mixed with 5 ml of the first agent to form a water repellent treatment liquid. The water repellent treatment liquid is coated on the surface of the ceramic product main body 1 having the first glass layer 4 and the second glass layer 5 and then dried by allowing to stand for about 10 minutes. Thereafter, the surface is washed with ethanol and dried.

Figure 9:
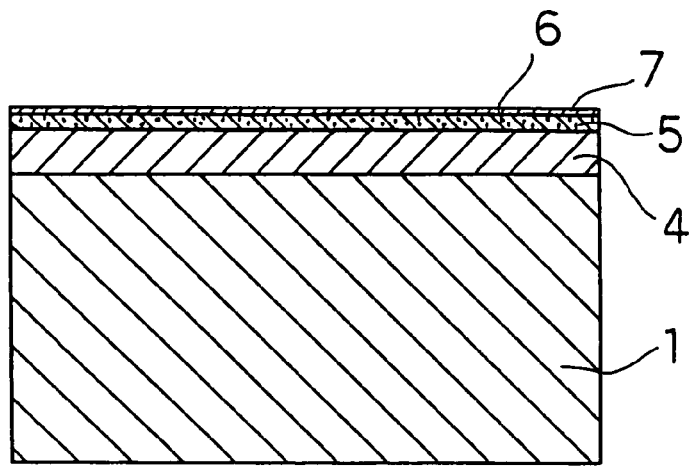
FIG. 9 is a cross sectional view of a ceramic product main body, a first glass layer, a second glass layer and a water repellent layer of Example relating to the second invention.

Through the foregoing procedures, as shown in FIG. 9, a sample is obtained, which comprises the ceramic product main body 1, the first glass layer 4 comprising the first glazing material formed on the ceramic product main body 1, the second glass layer 5 comprising the second glazing material, which is different from the first glazing material, containing the antibacterial metal and formed on the outer side of the first glass layer 4, and a water repellent layer 7 containing the water repellent component formed on the surface side of the second glass layer 5.

Comparative Example

Figure 10:
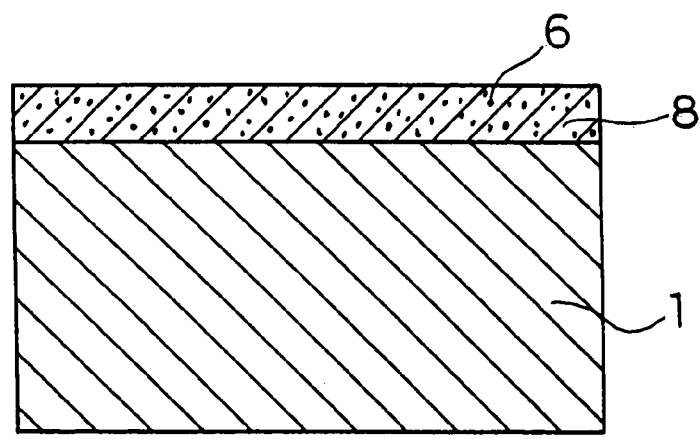
FIG. 10 is a cross sectional view of a ceramic product main body and a glass layer of Comparative Example relating to the second invention.

As shown in FIG. 10, a glazing material having the following composition is glazed on a base material 1 of the same kind as Example to form a glazing material layer.

| (Blending Proportions for Glazing Material (% by mass)) | |
|---|---|
| Feldspar | 10.0 |
| Kaolin | 5.0 |
| Silicate frit | 85.0 |

The silicate frit herein has the following composition (% by mass).

| | |
|---|---|
| SiO$_2$ | 67.4 |
| Al$_2$O$_3$ | 8.6 |
| MgO | 2.7 |
| CaO | 5.7 |
| SrO | 3.2 |
| Na$_2$O | 2.3 |
| K$_2$O | 3.2 |
| B$_2$O$_3$ | 3.5 |
| ZnO | 2.3 |
| MoO$_3$ | 1.1 |

The base material 1 having the glazing material layer is baked at 1,210° C. According to the procedures, the glazing material layer is melted to form a glass layer 8 on the ceramic product main body 1 as shown in FIG. 10. Thus, a sample is obtained, which comprises the ceramic product main body 1 and a glass layer 8 containing the antibacterial metal and comprising the glazing material, which is formed on the base body 1.

(Evaluation)

Samples of Example and Comparative Example are prepared and subjected to the following brushing test.

(Brushing Test)

A commercially available toothbrush having a commercially available abrasive coated is prepared, and the surface of the sample is scrubbed with the toothbrush 20 times under a constant pressure. According to the procedure, the number of flaws and the total length of the flaws (mm) per 4 cm$^2$ are obtained.

The results are shown in Table 2.

TABLE 2

| | Number of flaws | | | |
|---|---|---|---|---|
| | 0.7 (mm) or more | 0.3 to 0.6 (mm) | 0 to 0.2 (mm) | Total length of flaws (mm) |
| Comparative Example | 9 | 10 | 8 | 13.7 |
| Example | 1 | 4 | 2 | 2.8 |

It is understood from Table 2 that in the sample of Example, the first glass layer 4, the second glass layer 5 and the ceramic product main body 1 are difficult to be damaged in comparison to the sample of Comparative Example. It is considered this is caused by the following reasons (1) to (4).

(1) In Example, because the linear thermal expansion coefficient of the second glass layer is smaller than the linear thermal expansion coefficient of the first glass layer 4, the second glass layer 5 receives compression stress by contraction of the first glass layer 4 through the melting process of the first and second glazing material layers 2 and 3 and the cooling process of the first and second glass layers 4 and 5 in the baking step. Therefore, the second glass layer 5 is compacted to have high surface hardness. Accordingly, it is understood that the sample of Example is difficult to suffer formation of cracks in the glass layer and the like due to flaws and is also difficult to suffer attachment of stain due to flaws.

(2) Because the ceramic product main body 1 has a larger linear thermal expansion coefficient than the first glass layer 4, the first glass layer 4 receives compression stress from the ceramic product main body 1, and the first glass layer 4 is compacted. Therefore, the sample of Example is difficult to suffer growth of cracks formed in the glass layer and the like.

Figure 11:
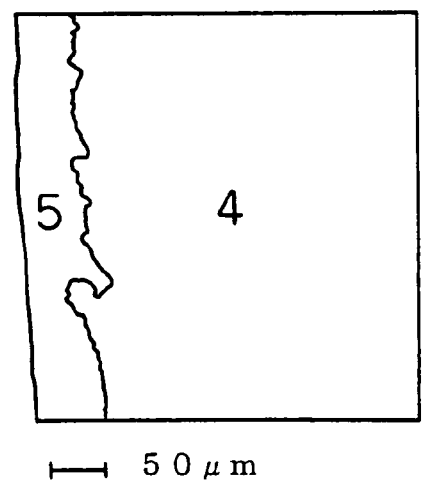
FIG. 11 is a result of a potassium surface analysis by EPMA of a cross section of a sample of Example relating to the second invention.

(3) Furthermore, it is understood that as shown in FIG. 11, the X-ray strength of the potassium Kα line in Example is in a low range of from 198 to 331 cps in the first glass layer 4 but is in a high range of from 331 to 463 cps in the second glass layer 5. Therefore, in Example, it can be said that sodium ions having a small ionic radius present in the second glass layer 5 are ion-exchanged by potassium ions having a large ionic radius present in the first glass layer 4, and potassium ions are diffused in the second glass layer 5. The second glass layer 5 thus forms compression stress by itself, and the second glass layer 5 is reinforced.

(4) Because the first glazing material is glazed on the base material 1 to form the first glazing material layer 2 in the sample of Example, the first glazing material is impregnated into the surface side of the base material 1, and the first glazing material impregnated into the base material 1 also constitutes the first glass layer 4 inside the ceramic product main body 1 comprising the base material 1. Therefore, the first glass layer 4 is firmly adhered to the ceramic product main body 1. The second glazing material 3 is glazed on the first glazing material layer 2 to form the second glazing material layer 3 in this sample, the second glazing material is impregnated into the first glazing material layer 2, whereby the first glass layer 4 and the second glass layer 5 are firmly adhered, and the formation of cracks growing at the interface therebetween can also be prevented. Further, according to the configuration, the baking step can be completed all at once to realize reduction in production cost.

Further, because the first glass layer 4 and the second glass layer 5 have a difference in thickness of 20/1, such a surface is obtained that has substantially no difference on appearance from the case where only the first glass layer 4 is formed even though the second glass layer 5 itself has poor appearance due to the inclusion of the silver compound 6.

Furthermore, in the samples of Example and Comparative Example, because the second glass layer 5 or the glass layer 8 contains the silver compound 6 as an antibacterial metal, they have antibacterial function. In Example, because only the second glass layer 5 among the glass layers contains the silver compound 6, the concentration of the silver compound 6 on the surface side can be increased even when a smaller amount of the silver compound than Comparative Example is used, so as to realize exertion of higher antibacterial function. Unnecessary consumption of the silver compound 6 can also be prevented. In Example, because the second glazing material has a higher viscosity upon melting than the first glazing material, degasification upon baking is smoothly carried out, whereby blister of the sample can be prevented, and also the rate of diffusion of the silver compound 6 from the second glass layer 5 to the first glass layer 4 upon baking is decreased, so as to produce a sample having the concentration of the silver compound 6 on the surface that is maintained at a high level.

In the sample of Example, because the water repellent layer 7 is formed on the surface of the second glass layer 5, even when water containing a large amount of stain components is applied to the surface of the second glass layer 5 having a slight amount of flaws, the stain is difficult to remain owing to the water repellent function thereof to exert excellent stain resistant effect. Particularly, in Example, because the phosphoric acid compound is contained in the second glazing material, the antibacterial function due to the silver compound 6 is liable to be exerted. In Example, because the water repellent layer 7 is formed on the surface of the second glass layer 5, both the antibacterial function and the water repellent function are imparted, and thus in the case where water containing a large amount of stain components, to which the stain resistant effect is insufficient only by the antibacterial function, is applied, the stain is difficult to remain owing to the water repellent function, whereby the stain resistant effect is sufficiently exerted.

(Third Invention)

Examples 1 to 7 practicing the third invention and Comparative Examples 1 to 4 will be described below.

Example 1

Figure 12:
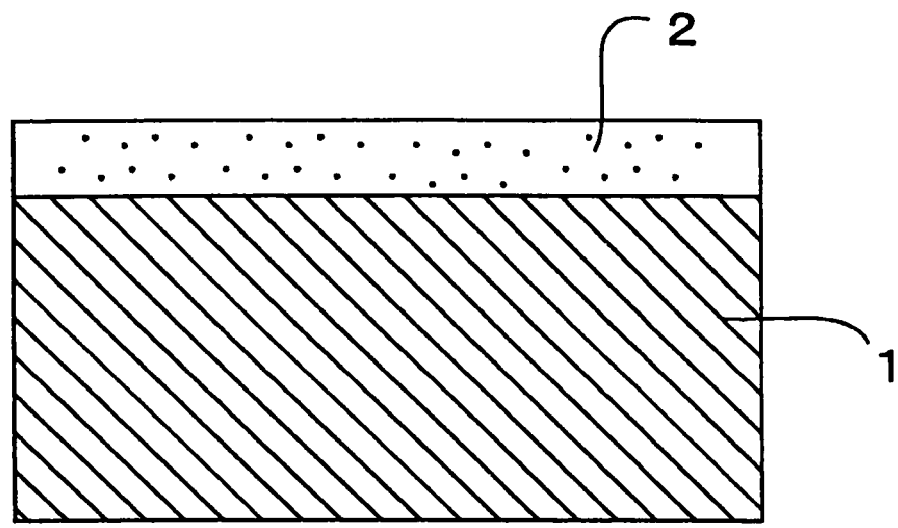
FIG. 12 is a cross sectional view of a base material and a first glazing material layer of Examples 1 to 7 relating to the third invention.
Figure 13:
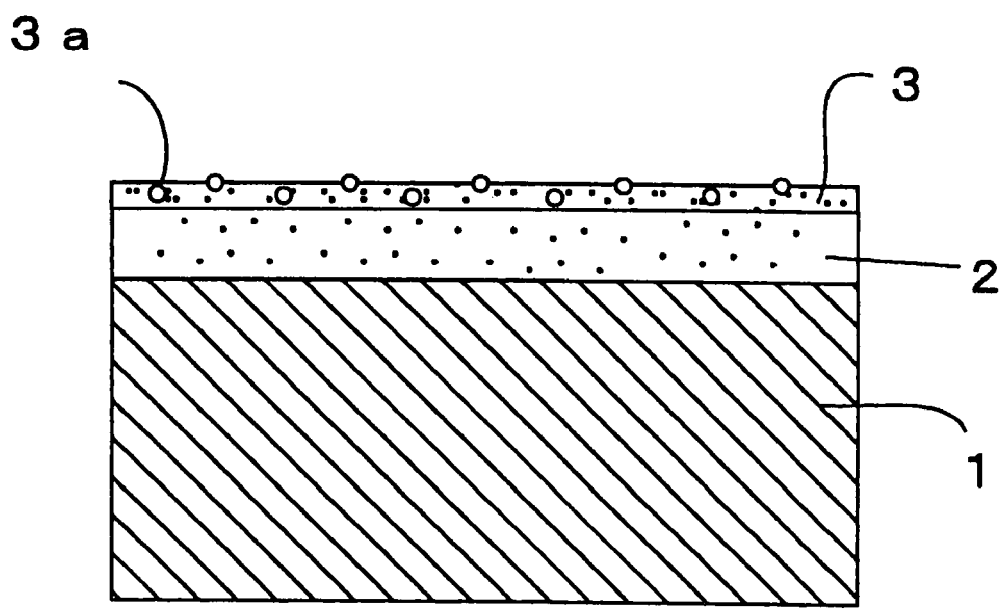
FIG. 13 is a cross sectional view of a base material, a first glazing material layer and a second glazing material layer of Examples 1 to 7 relating to the third invention.

"Preparation Step" As shown in FIG. 12 and FIG. 13, a base material for tiles 1 is prepared from the following composition cut into a quadrate of 50±2 mm square (thickness: 10 mm or less).

| (Blending Proportions for Base Material 1 (% by mass)) | |
| --- | --- |
| Feldspar | 28.2 |
| Silica sand | 11.8 |
| Sericite | 15.0 |
| Clay | 45.0 |

A first glazing material and a second glazing material having the following compositions are prepared.

| (Blending Proportions for First Glazing Material (% by mass)) | |
| --- | --- |
| Feldspar | 42.456 |
| Frit | 1.617 |
| Lime | 11.827 |
| Dolomite | 5.054 |
| Zinc white | 1.516 |
| Gairome clay | 4.043 |
| Alumina | 1.769 |
| Silica sand | 9.603 |
| Opacifier | 6.368 |
| Chamotte fireproof material | 15.163 |
| Pigment | 0.581 |

The frit herein has the following composition (% by mass).

| | |
| --- | --- |
| $SiO_2$ | 49.3 |
| $Al_2O_3$ | 11.1 |
| CaO | 0.2 |
| $Na_2O$ | 19.1 |
| $K_2O$ | 1.0 |
| $B_2O_3$ | 19.2 |

The first glazing material contains 2% by mass of $K_2O$.

| (Blending Proportions for Second Glazing Material (% by mass)) | |
| --- | --- |
| Silica sand | 31.0 |
| Lime | 6.0 |
| Clay | 13.0 |
| Antibacterial agent | 50.0 |

The antibacterial agent has the following composition (% by mass).

| | |
| --- | --- |
| $Ag_2O$ | 25.88 |
| $P_2O_5$ | 4.98 |
| CaO | 0.01 |
| $SiO_2$ | 56.84 |
| $Al_2O_3$ | 9.36 |
| $Fe_2O_3$ | 0.10 |
| $K_2O$ | 0.43 |
| $Na_2O$ | 0.06 |
| SrO | 0.01 |
| Ignition loss | 2.34 |

1% by mass in terms of outside account of zircon fine particles 3a having an average particle diameter of 0.81 μm are contained as hard fine particle in the foregoing composition to form the second glazing material. The second glazing material contains 2% by mass of $Na_2O$.

"Glazing Step"

As shown in FIG. 12, the first glazing material is glazed on the surface of the base material 1 to form a first glazing material layer 2, and then as shown in FIG. 13, the second glazing material is glazed on the surface side of the first glazing material layer 2 to form a second glazing material layer 3.

"Baking Step"

The base material 1 having the first glazing material layer 2 and the second glazing material layer 3 is baked at 1,210° C.

Figure 14:
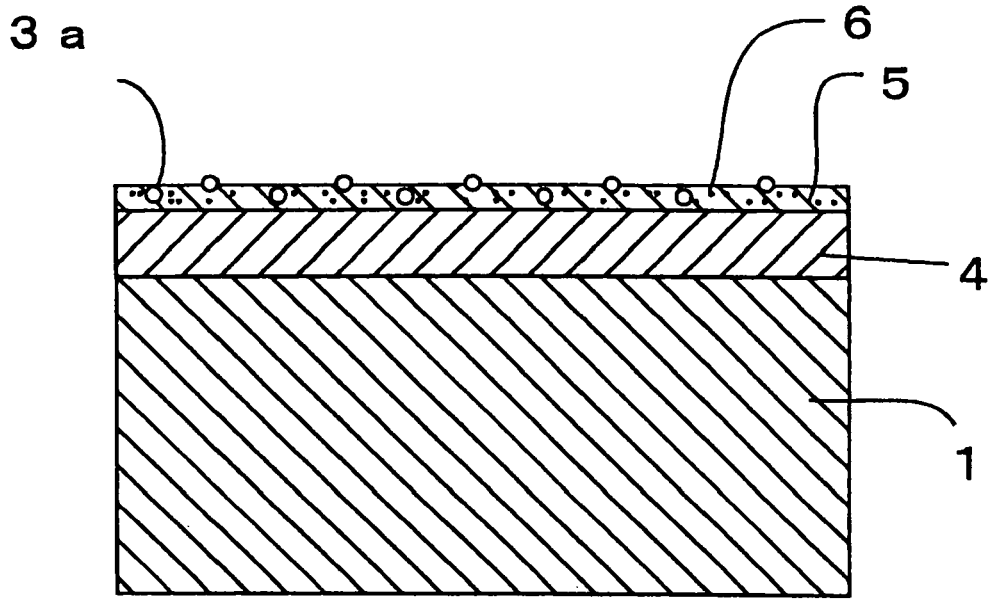
FIG. 14 is a cross sectional view of a ceramic product main body, a first glass layer and a second glass layer of Examples 1 to 7 relating to the third invention.

According to the procedure, the base material 1 is sintered, and the first glazing material layer 2 and the second glazing material layer 3 are melted to form a first glass layer 4 and a second glass layer 5 on a ceramic product main body 1 as shown in FIG. 14. The zircon fine particles 3a are present in the surface of the second glass layer 5 in a dispersed state.

Herein, the second glass layer 5 has a smaller linear thermal expansion coefficient than the linear thermal expansion coefficient of the first glass layer 4, and the difference therebetween is $3 \times 10^{-7}/°C$. Further, the first glass layer 4 has a smaller linear thermal expansion coefficient than the linear thermal expansion coefficient of the ceramic product main body 1, and the difference therebetween is $4 \times 10^{-7}/°C$. Furthermore, the first glass layer 4 and the second glass layer 5 have a difference in thickness of 20/1. The second glass layer 5 has the silver compound 6 as an antibacterial metal dispersed therein.

"Water Repellent Treatment Step"

The following water repellent treatment step is then carried out on the surface of the second glass layer 5.

A first agent is prepared, which is formed with $C_8F_{17}CH_2CH_2Si(OCH_3)_3$ as a perfluoroalkyl group-containing organic silicon compound and $Si(CH_3O)_3CH_2CH_2$—$(Si(CH_3)_2O)_{10}$—$Si(CH_3)_2CH_2CH_2Si(OCH_3)_3$ as a hydrolyzable group-containing polymethylsiloxane compound, which are co-hydrolyzed in a hydrophilic solvent containing 0.1N aqueous hydrochloric acid, t-butanol and hexane. It is considered that they contain silanol (Si—OH) groups respectively.

A mixture of polyorganosiloxane (HO—$(Si(CH_3)_2O)_{30}$—$Si(CH_3)_2OH$) and methanesulfonic acid as a strong acid is prepared as a second agent.

5 ml of the second agent is added to and mixed with 5 ml of the first agent to form a water repellent treatment liquid. The water repellent treatment liquid is coated on the surface of the ceramic product main body 1 having the first glass layer 4 and the second glass layer 5 and then dried by allowing to stand for about 10 minutes. Thereafter, the surface is washed with ethanol and dried.

Figure 15:
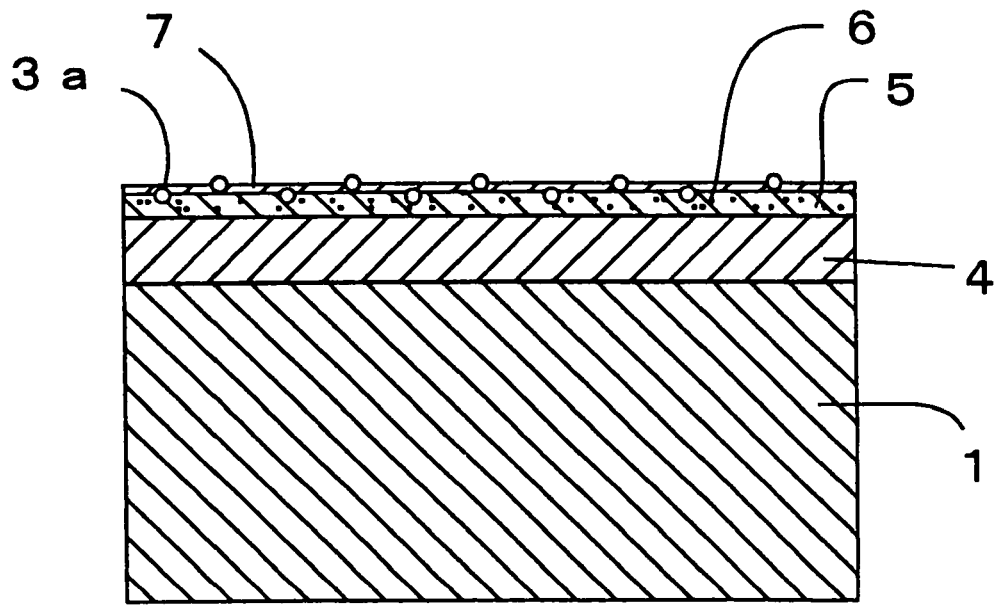
FIG. 15 is a cross sectional view of a sample of Examples 1 to 7 relating to the third invention.
Figure 16:
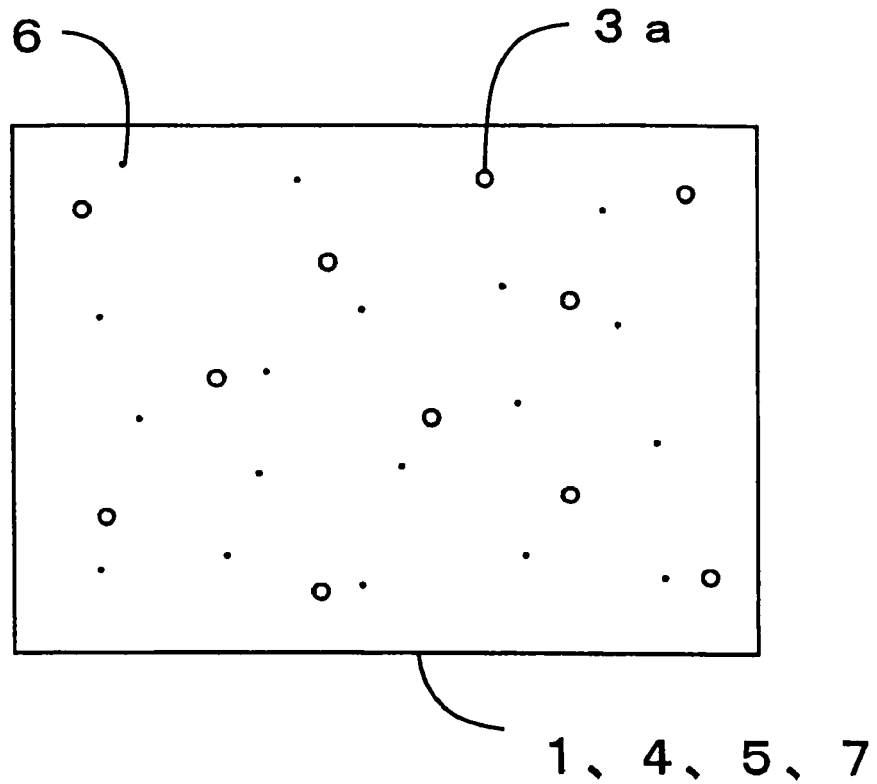
FIG. 16 is an upper view of a sample of Examples 1 to 7 relating to the third invention.

Through the foregoing procedures, as shown in FIG. 15 and FIG. 16, a sample is obtained, which comprises the ceramic product main body 1, the first glass layer 4 comprising the first glazing material formed on the ceramic product main body 1, the second glass layer 5 comprising the second glazing material, which is different from the first glazing material, containing the antibacterial metal and formed on the outer side of the first glass layer 4, and a water repellent layer 7 containing the water repellent component formed on the surface side of the second glass layer 5, and further contains the zircon fine particle 3a present over the second glass layer and the surface of the water repellent layer 7.

Example 2

In the preparation step of Example 1, 2% by mass in terms of outside account of the zircon fine particles 3a in Example 1 are contained in the second glazing material. The other conditions are the same as in Example 1.

Example 3

In the preparation step of Example 1, 1% by mass in terms of outside account of zircon fine particles 3a having an average particle diameter of 1.55 μm are contained as hard fine particle in the second glazing material. The other conditions are the same as in Example 1.

Example 4

In the preparation step of Example 1, 2% by mass in terms of outside account of the zircon fine particles 3a in Example 3 are contained in the second glazing material. The other conditions are the same as in Example 1.

Example 5

In the preparation step of Example 1, 1% by mass in terms of outside account of zircon fine particles 3a having an average particle diameter of 20 μm are contained as hard fine particle in the second glazing material. The other conditions are the same as in Example 1.

Example 6

In the preparation step of Example 1, 2% by mass in terms of outside account of the zircon fine particles 3a in Example 5 are contained in the second glazing material. The other conditions are the same as in Example 1.

Example 7

In the preparation step of Example 1, 4% by mass in terms of outside account of the zircon fine particles 3a in Example 5 are contained in the second glazing material. The other conditions are the same as in Example 1.

Comparative Example 1

Figure 17:
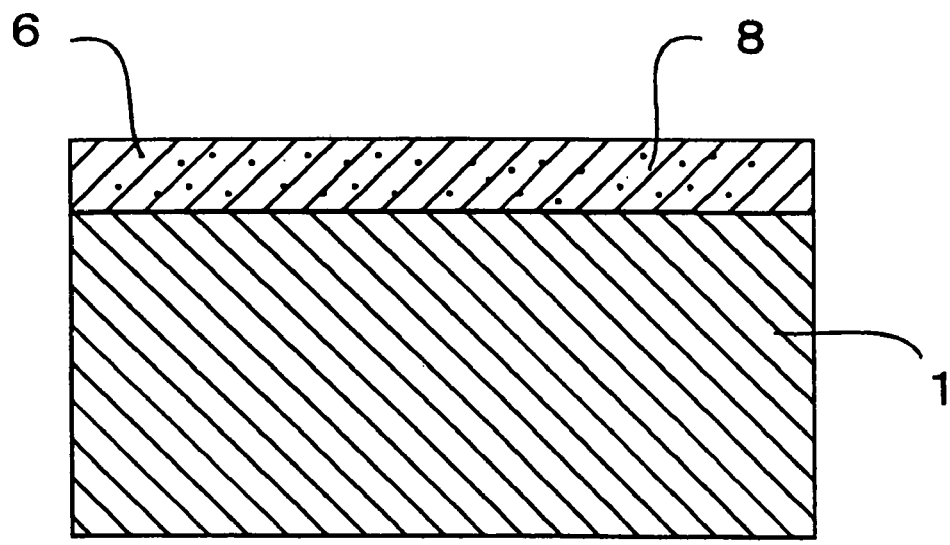
FIG. 17 is a cross sectional view of a sample of Comparative Examples 1 and 2 relating to the third invention.

As shown in FIG. 17, a glazing material having the following composition is glazed on a base material 1 of the same kind as Example 1 to form a glazing material layer.

| (Blending Proportions for Glazing Material (% by mass)) | |
|---|---|
| Feldspar | 10.0 |
| Kaolin | 5.0 |
| Frit | 85.0 |

The frit herein has the following composition (% by mass)

| | |
|---|---|
| $SiO_2$ | 67.4 |
| $Al_2O_3$ | 8.6 |
| MgO | 2.7 |
| CaO | 5.7 |
| SrO | 3.2 |
| $Na_2O$ | 2.3 |
| $K_2O$ | 3.2 |
| $B_2O_3$ | 3.5 |
| ZnO | 2.3 |
| $MoO_3$ | 1.1 |

The base material 1 having the glazing material layer is baked at 1,210° C. According to the procedures, the glazing material layer is melted to form a glass layer 8 on the ceramic product main body 1. Thus, a sample is obtained, which comprises the ceramic product main body 1 and a glass layer 8 comprising the glazing material formed on the base body 1.

Comparative Example 2

A glazing material having the following composition is glazed on a base material 1 of the same kind as Example 1 to form a glazing material layer. The base material 1 having the glazing material layer is baked at 1,210° C. to obtain the similar sample as the sample of Comparative Example 1 shown in FIG. 17.

| (Blending Proportions for Glazing Material (% by mass)) | |
|---|---|
| Feldspar | 42.456 |
| Frit | 1.617 |
| Lime | 11.827 |
| Dolomite | 5.054 |
| Zinc white | 1.516 |
| Gairome clay | 4.043 |
| Alumina | 1.769 |
| Silica sand | 9.603 |
| Opacifier | 6.368 |
| Chamotte fireproof material | 15.163 |
| Pigment | 0.581 |

The frit herein is the same as in Example 1. 6.3% by mass in terms of outside account of zircon fine particles having an average particle diameter of 1.55 μm are contained in the foregoing composition to form a glazing material.

Comparative Example 3

Figure 18:
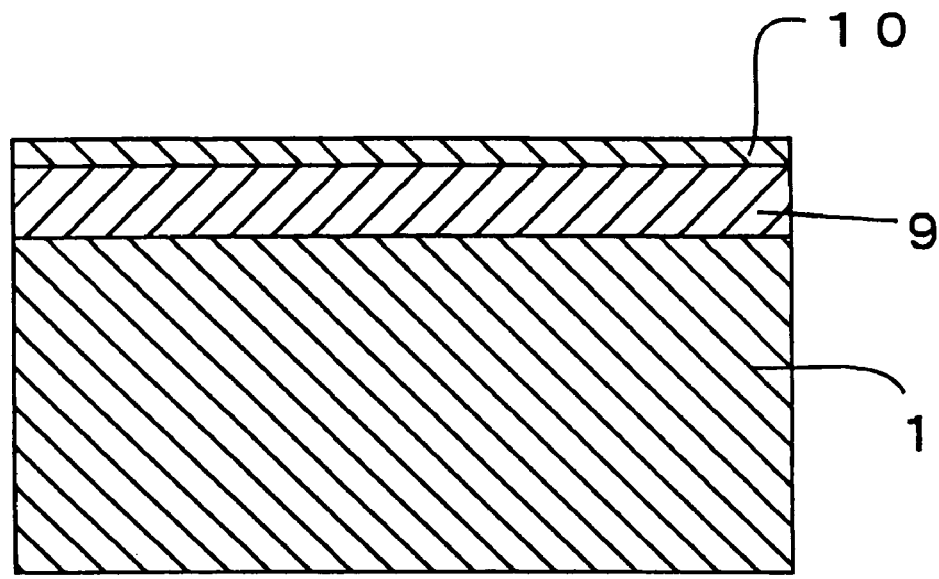
FIG. 18 is a cross sectional view of a sample of Comparative Examples 3 and 4 relating to the third invention.

The same base material 1 as in Example 1, a first glazing material comprising the glazing material of Comparative Example 2, and a second glazing material having the following composition are prepared. A base material 1 having a first glazing material layer and a second glazing material layer is baked at 1,210° C. to obtain a sample. According to the procedures, as shown in FIG. 18, a ceramic product main body 1, a first glass layer 9 comprising the first glazing material formed on the ceramic product main body 1, and a second glass layer 10 comprising the second glazing material formed on the glass layer 9.

| (Blending Proportions for Second Glazing Material (% by mass)) | |
|---|---|
| Silica sand | 31.0 |
| Lime | 2.3 |
| Clay | 12.4 |
| Zinc white | 3.9 |
| Frit | 0.5 |
| Antibacterial agent | 50.0 |

The frit is the same as in Comparative Example 1, and the antibacterial agent is the same as in Example 1.

Comparative Example 4

The same base material 1 as in Example 1, a first glazing material comprising the glazing material of Comparative Example 2, and a second glazing material having the following composition are prepared. A base material 1 having a first glazing material layer and a second glazing material layer is baked at 1,210° C. to obtain a sample that is similar to the sample of Comparative Example 3 shown in FIG. 18.

| (Blending Proportions for Second Glazing Material (% by mass)) | |
|---|---|
| Silica sand | 33.0 |
| Lime | 8.5 |
| Alumina | 7.0 |
| Antibacterial agent | 51.2 |

The antibacterial agent is the same as in Example 1.

(Evaluation)

Samples of Examples 1 to 7 and Comparative Examples 1 to 4 are prepared, and pinholes on the surface are confirmed with a digital microscope to evaluate the smoothness. They are shown in Table 3. In Table 3, those excellent in smoothness are shown with A, and those lacking smoothness are shown with B.

TABLE 3

| | | | Number of flaws | | | |
|---|---|---|---|---|---|---|
| Sample | | Smoothness | 0.7 (mm) or more | 0.3 to 0.6 (mm) | 0 to 0.2 (mm) | Total length of flaws (mm) |
| Example | 1 | A | 1 | 1 | 2 | 1.7 |
| | 2 | A | 0 | 0 | 0 | 0.0 |
| | 3 | A | 0 | 1 | 2 | 0.6 |
| | 4 | A | 1 | 1 | 4 | 1.8 |
| | 5 | A | 2 | 2 | 0 | 3.0 |
| | 6 | A | 0 | 1 | 1 | 0.7 |
| | 7 | A | 0 | 0 | 0 | 0.0 |
| Comparative Example | 1 | B | 9 | 10 | 8 | 13.7 |
| | 2 | B | 0 | 1 | 1 | 0.6 |
| | 3 | A | 6 | 5 | 17 | 10.3 |
| | 4 | A | 1 | 4 | 2 | 2.8 |

It is understood from Table 3 that the samples of Examples 1 to 7 Comparative Examples 3 and 4 have substantially no pinhole on the surface and exhibit excellent smoothness. On the other hand, the samples of Comparative Examples 1 and 2 have pinholes on the surface even in a small amount and are rather inferior in smoothness. This is because the glass layers of the samples of Examples 1 to 7 and Comparative Examples 3 and 4 each has the first glass layer and the second glass layer, and thus even when pinholes are formed up to the first glass layer due to influence of the base material 1, the influence of the base material 1 is difficult to extend to the second glass layer, and pinholes are difficult to occur on the surface of the second glass layer. Therefore, it is understood that the samples of Examples 1 to 7 and Comparative Examples 3 and 4 have higher smoothness and realize excellent stain resistance.

In the samples of Examples 1 to 7, the zircon fine particles 3a are contained in such an extent of amount that does not influence the coloration of the second glass layer 5 and are dispersed in such a dispersed state that does not influence the smoothness on the surface of the second glass layer 5, whereby excellent appearance is exerted.

Furthermore, because the samples of Examples 1 to 7 have the water repellent layer 7 on the surface side of the second glass layer 5, even when water containing a large amount of stain components is applied to the surface of the second glass layer 5 having a slight amount of flaws, the stain is difficult to remain owing to the water repellent function thereof to exert excellent stain resistant effect. Moreover, in the samples of Examples 1 to 7, because the silver compound 6 as an antibacterial metal is contained in the second glass layer 5, it has antibacterial function, and excellent stain resistant function is also exerted thereby.

Samples of Examples 1 to 7 and Comparative Examples 1 to 4 are subjected to the following brushing test.

(Brushing Test)

A commercially available toothbrush having a commercially available abrasive coated is prepared, and the surface of the sample is scrubbed with the toothbrush 20 times under a constant pressure. According to the procedure, the number of flaws and the total length of the flaws (mm) per 4 cm$^2$ are obtained. The results are also shown in Table 3.

It is understood from Table 3 that the samples of Examples 1 to 7 and Comparative Examples 2 and 4 are difficult to suffer formation of flaws. This is because the linear thermal expansion coefficient of the second glass layer is smaller than the linear thermal expansion coefficient of the first glass layer in samples of Examples 1 to 7 and Comparative Examples 4, and therefore the second glass layer is compacted by receiving compression stress caused by contraction of the first glass layer to make a high surface hardness. Particularly, in the samples of Examples 1 to 7, large flaws are not formed since abrasion of an abrasive is inhibited by the zircon fine particles 3a present on the water repellent layer 7. Therefore, it is understood that in the samples of Examples 1 to 7, stain due to flaws and cracks is difficult to be attached to exert excellent stain resistance.

Figure 19:
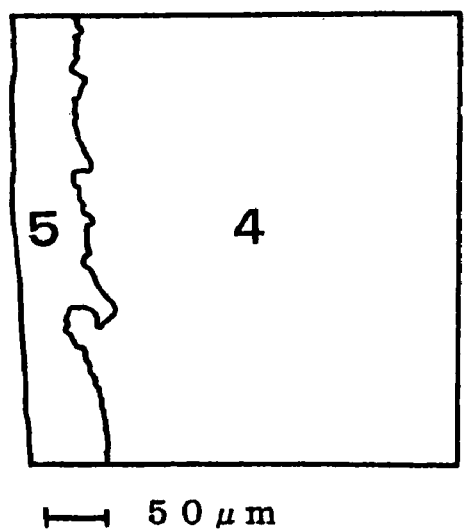
FIG. 19 is a result of a potassium surface analysis by EPMA of a cross section of a sample of Examples 1 to 7 relating to the third invention.

Furthermore, it is understood that as shown in FIG. 19, the X-ray strength of the potassium Kα line in the samples of Examples 1 to 7 is in a low range of from 198 to 331 cps in the first glass layer 4 but is in a high range of from 331 to 463 cps in the second glass layer 5. Therefore, in the samples of Examples 1 to 7, it can be said that sodium ions having a small ionic radius present in the second glass layer 5 are ion-exchanged by potassium ions having a large ionic radius present in the first glass layer 4, and potassium ions are diffused in the second glass layer 5. The second glass layer 5 thus forms compression stress by itself, and the second glass layer 5 is reinforced.

(Antibacterial Test)

Three pieces each of the samples of Examples 1 to 7 and Comparative Examples 1 to 4 are prepared and subjected to an antibacterial performance test by the film method. The average change rate differences of *Esherichia coli* (IFO3972) at respective nutrition concentrations are shown in Table 4. The average change rate differences of *Staphylococcus aureus* (IFO12732) at respective nutrition concentrations are shown in Table 5. In Tables 4 and 5, no antibacterial effect is observed at an average change rate difference of less than 2.0.

TABLE 4

| Nutrition concentration | Example | | | | | | | Comparative Example | | | |
|---|---|---|---|---|---|---|---|---|---|---|---|
| | 1 | 2 | 3 | 4 | 5 | 6 | 7 | 1 | 2 | 3 | 4 |
| 1/500 NB | 5.5 | 5.5 | 5.5 | 5.5 | 5.5 | 5.5 | 5.5 | 2.4 | 2.4 | 5.5 | 5.5 |
| 1/200 NB | 4.2 | 4.2 | 4.2 | 4.2 | 4.2 | 4.2 | 4.2 | 1.2 | 1.2 | 4.2 | 4.2 |
| 1/50 NB | 2.7 | 2.7 | 2.7 | 2.7 | 2.7 | 2.7 | 2.7 | 0.0 | 0.0 | 2.7 | 2.7 |

TABLE 5

| Nutrition concentration | Example | | | | | | | Comparative Example | | | |
|---|---|---|---|---|---|---|---|---|---|---|---|
| | 1 | 2 | 3 | 4 | 5 | 6 | 7 | 1 | 2 | 3 | 4 |
| 1/500 NB | 4.8 | 4.8 | 4.8 | 4.8 | 4.8 | 4.8 | 4.8 | 2.2 | 2.2 | 4.8 | 4.8 |
| 1/200 NB | 3.7 | 3.7 | 3.7 | 3.7 | 3.7 | 3.7 | 3.7 | 0.0 | 0.0 | 3.7 | 3.7 |
| 1/50 NB | 2.3 | 2.3 | 2.3 | 2.3 | 2.3 | 2.3 | 2.3 | 0.0 | 0.0 | 2.3 | 2.3 |

It is understood from Table 4 and Table 5 that with respect to the antibacterial function for both kinds of bacteria, an average change rate difference of 2.0 or more is maintained even when the nutrition concentration is increased in samples of Examples 1 to 7, whereas an average change rate difference of 2.0 or more is maintained only in the case of 1/500 NB or less in samples of Comparative Examples 1 and 2. Therefore, it is understood that the samples of Examples 1 to 7 exert excellent in stain resistance in comparison to the samples of Comparative Examples 1 and 2. It is also understood that because the silver compound 6 as an antibacterial metal is contained only in the second glass layer 5 among the glass layers in the samples of Examples 1 to 7, the concentration of the silver compound 6 on the surface side can be increased even when a smaller amount of the antibacterial agent than the conventional one is used, whereby exertion of higher antibacterial function can be realized. It is further understood that unnecessary consumption of the antibacterial agent can be prevented in the samples of Examples 1 to 7.

It is understood that the samples of Examples 1 to 7 show average change rate differences of the similar level as the samples of Comparative Examples 3 and 4. Therefore, it is understood that as shown in FIG. 15 the samples of Examples 1 to 7 can exert stain resistance that is equivalent to the samples of Comparative Examples 3 and 4 even though they have the zircon fine particles 3a present over the second glass layer 5 to the surface of the water repellent layer 7.

Therefore, the samples of Examples 1 to 7 are excellent in surface smoothness and are difficult to suffer formation of flaws on the surface, and thus excellent stain resistance is certainly exerted.

Examples and Comparative Examples shown in the foregoing are only exemplification, and the first to third inventions may be carried out in embodiments, to which various changes are made unless they deviate from the substance thereof.

APPLICABILITY IN INDISTRIES

According to the process for stain resistant treatment of the first invention, a product having a glass layer can be produced that can be produced at a low cost and can exhibit excellent antibacterial function.

In the reinforced ceramic product of the second invention, the surface of the glass layer is difficult to suffer formation of flaws.

In the product having a glass layer of the third invention, the surface is difficult to suffer formation of flaws, and thus excellent stain resistance is certainly exerted.

The invention claimed is:

1. A product having a glass layer, comprising:
   a ceramic product main body, and
   a glass layer formed on a surface of said ceramic product main body,
   characterized in that said glass layer comprises:
   a first glass layer comprising a first glazing material, and
   a second glass layer comprising a second glazing material that is formed on an outer side of said first glass layer, wherein said second glass layer contains an antibacterial metal, and zircon fine particles for preventing growth of cracks are dispersed on a surface of said second glass layer, and
   said ceramic product main body has a larger linear thermal expansion coefficient than said first glass layer.

2. A product having a glass layer comprising:
   a ceramic product main body, and
   a glass layer formed on a surface of said ceramic product main body, characterized in that said glass layer comprises:
   a first glass layer comprising a first glazing material, and
   a second glass layer comprising a second glazing material that is formed on an outer side of said first glass layer, wherein said second glass layer contains an antibacterial metal, and zircon fine particles for preventing growth of cracks are dispersed on a surface of said second glass layer, and
   said second glass layer contains a larger amount of potassium and a smaller amount of sodium than said first glass layer.

3. A product having a glass layer, comprising:
   a ceramic product main body, and
   a glass layer formed on a surface of said ceramic product main body,
   characterized in that said glass layer comprises:
   a first glass layer comprising a first glazing material, and
   a second glass layer comprising a second glazing material that is formed on an outer side of said first glass layer, wherein said second glass layer contains an antibacterial metal, and zircon fine particles for preventing growth of cracks are dispersed on a surface of said second glass layer, and an average particle diameter of said zircon fine particles is 0.8 µm or more;
   wherein said second glazing material contains 0.5 to 2.0% by mass in terms of outside account of said zircon fine particles.

* * * * *